United States Patent Office 3,803,170
Patented Apr. 9, 1974

3,803,170
2-[(1-BENZYLCYCLOPENTYL)IMINO]
PYRROLIDINE
J. Martin Grisar, George P. Claxton, Thomas R. Blohm, and Edward McC. Roberts, Cincinnati, Ohio, assignors to Richardson-Merrell Inc., New York, N.Y.
No Drawing. Filed Aug. 11, 1972, Ser. No. 280,048
Int. Cl. C07d 27/00, 27/02
U.S. Cl. 260—326.85                    2 Claims

ABSTRACT OF THE DISCLOSURE

2 - [(1 - benzylcyclopentyl)imino]pyrrolidine and pharmaceutically acceptable acid addition salts thereof possess useful hypoglycemic properties.

FIELD OF INVENTION

This invention relates to 2 - [(1 - benzylcyclopentyl)-imino]pyrrolidine and pharmaceutically acceptable acid addition salts thereof useful as hypoglycemic agents.

SUMMARY OF INVENTION

The novel compound of this invention useful as a hypoglycemic agent is 2-[(1 - benzylcyclopentyl)imino] pyrrolidine and may be represented by the following Formula I.

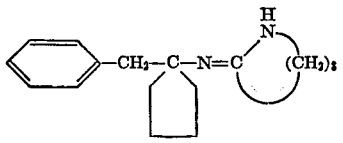

(Formula I)

Pharmaceutically acceptable acid addition salts of the compound of Formula I are also within the scope of this invention.

DETAILED DESCRIPTION OF INVENTION

Pharmaceutically acceptable acid addition salts of the base compound of this invention are those of any suitable inorganic or organic acid. Suitable inorganic acids are, for example, hydrochloric, hydrobromic, sulfuric, or phosphoric acids and the like. Suitable organic acids are, for example, carboxylic acids such as acetic, propionic, glycolic, lactic, pyruvic, malonic, succinic, fumaric, malic, tartaric, citric, ascorbic, maleic, hydroxymaleic, benzoic, hydroxybenzoic, phenylacetic, cinnamic, salicylic, 2-phenoxybenzoic and the like, or sulfonic acid and the like.

The compound of this invention is named and represented as a substituted 2 - iminoperhydroazacarbocyclic, as represented by Formula I. It is known however that this compound as an acid addition salt may also be represented by the tautomeric form illustrated by the following

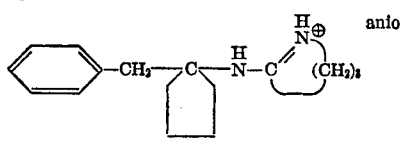

(Formula II)

This tautomerism has been discussed by R. Kwok and P. Pranc, J. Org. Chem. 32, 740 (1967). The compound of Formula II could be named differently than the compound as represented by Formula I. In solution under the conditions of the therapeutic utility, the proportion of each tautomeric form, or the delocalization of the charge between the two nitrogen atoms will be dependent upon numerous factors including the nature of the substituents, the pH of the medium, and the like. The equilibrium state is conveniently depicted by the following Formula III.

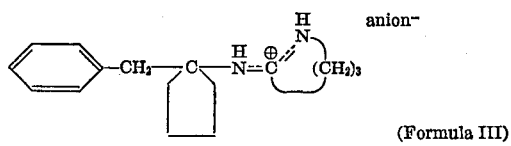

(Formula III)

It is understood that this invention relates to the novel compound represented or named in either tautomeric form as illustrated by Formulas I and II.

The novel compound of this invention and pharmaceutically acceptable acid addition salts thereof posses useful hypoglycemic properties. To illustrate, the hydrochloride salt of 2 - [(1 - benzylcyclopentyl)imino]pyrrolidine administered to glucose-primed rats at 100, 50, 25, and 12.5 mg./kg. (milligrams per kilogram) orally reduced plasma glucose respectively by 60, 42, 26, and 21 percent of control.

The novel compound of this invention can be administered to animals, mammals, and humans either alone or in the form of pharmaceutical preparations which contain the novel compound suitable for oral or parenteral administration. Pharmaceutical preparations containing the novel compound and conventional pharmaceutical carriers can be employed in unit dosage forms such as solids, for example tablets, capsules and pills, or liquid solutions, suspensions, or elixirs for oral administration, or liquid solutions, suspensions, emulsions and the like for parenteral use. The quantity of compound administered can vary over a wide range to provide from about 1.0 mg./kg. to about 100 mg./kg. of body weight of the patient per day to achieve the desired effect. Unit doses of this compound can contain, for example, from about 25 to 500 mg. of the compound and may be administered, for example, 1 to 4 times daily.

The compound of this invention may be prepared by reacting an excess of a compound of the formula

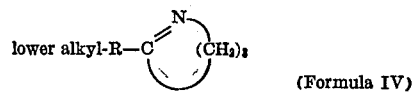

(Formula IV)

with a primary amine of the formula

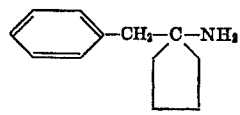

Formula V in a manner similar to that reported by R. E. Benson and T. L. Cairns, J. Am. Chem. Soc. 70, 2115–8 (1948). In the above Formula IV the symbol R represents oxygen or divalent sulfur. Preferably the reaction is carried out with the compound of Formula IV wherein R represents oxygen. Although it is preferred that the reaction be completed without solvent, lower alcohol solvents such as methanol, ethanol, isopropyl alcohol and the like may be employed. In general it is preferred that the hydrochloride salt of the amine as represented by Formula V be used in the reaction. The temperature of the reaction varies from 0° to 40° C., and the preferred temperature is about 15° to 25° C. The reaction time varies from 15 to 60 days.

EXAMPLE 1

2-[(1-benzylcyclopentyl)imino]pyrrolidine hydrochloride

To 12.0 g. (0.057 mole) of powdered 1-benzylcyclopentylamine hydrochloride is added 10 ml. of O-methylbutyrolactim. The reactants are thoroughly mixed and allowed to stand at room temperature. After 13 days most of the starting amine salt is dissolved, and the product is beginning to crystallize. After 26 days from the initial mixing of the reactants the mixture is cooled to −20° C. after which the product is collected and recrystallized twice from a mixture of acetone and methanol to give 2-[(1 - benzylcyclopentyl)imino]pyrrolidine hydrochloride, M.P. 216–217° C.

The hydrochloride salt of 2-[(1-benzylcyclopentyl)-imino]pyrrolidine can be converted to the free base with a solution of 2 N sodium hydroxide. Other salt forms can be obtained by addition of the appropriate acid to the free base.

EXAMPLE 2

An illustrative composition for tablets is the following:

| | Per tablet, mg. |
|---|---|
| (a) 2-[(1-benzylcyclopentyl)imino]pyrrolidine hydrochloride | 100.0 |
| (b) Wheat starch | 15.0 |
| (c) Lactose | 33.5 |
| (d) Magnesium stearate | 1.5 |

A granulation obtained upon mixing lactose with the starch and granulated starch paste is dried, screened and mixed with the active ingredient, that is, (a), and magnesium stearate. The mixture is compressed into tablets weighing 150 mg. each.

EXAMPLE 3

An illustrative composition for a hard gelatin capsule is the following:

| | Per capsule, mg. |
|---|---|
| (a) 2-[(1-benzylcyclopentyl)imino]pyrrolidine hydrochloride | 200.0 |
| (b) Talc | 35.0 |

The formulation is prepared by passing the dry powders of (a) and (b) through a fine mesh screen and mixing them well. The powder is then filled into No. 0 hard gelatin capsules at a net fill of 235 mg. per capsule.

EXAMPLE 4

An illustrative composition for a parenteral injection is the following wherein the quantities are on a weight to volume basis.

| | Mg. |
|---|---|
| (a) 2-[(1-benzylcyclopentyl)imino]pyrrolidine hydrochloride | 100.0 |
| (b) Sodium chloride q.s. | |
| (c) Water for injection to make 10 ml. | |

The composition is prepared by dissolving the active ingredient and sufficient sodium chloride in water for injection to render the solution isotonic. The composition may be dispensed in a single ampule containing 100 mg. of the active ingredient for multiple dosage or in 10 ampules for a single dose.

We claim:

1. The compound 2 - [(1 - benzylcyclopentyl)imino]-pyrrolidine and pharmaceutically acceptable acid addition salts thereof.

2. A compound of claim 1 which is 2-[(1-benzylcyclopentyl)imino]pyrrolidine hydrochloride.

References Cited

UNITED STATES PATENTS 3,318,909    5/1967    Majewski _____ 260—326.85

JOSEPH A. NARCAVAGE, Primary Examiner

U.S. Cl. X.R.

260—326.9; 424—274